(12) United States Patent
McClellan

(10) Patent No.: US 7,193,971 B2
(45) Date of Patent: Mar. 20, 2007

(54) ACTIVE PATH SELECTION FOR SCTP

(75) Inventor: Stanley A. McClellan, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1005 days.

(21) Appl. No.: 10/178,716

(22) Filed: Jun. 24, 2002

(65) Prior Publication Data
US 2003/0235151 A1 Dec. 25, 2003

(51) Int. Cl.
H04J 3/14 (2006.01)
(52) U.S. Cl. ...................................... 370/238; 370/252
(58) Field of Classification Search ................ 370/238, 370/351, 252, 253, 400, 237
See application file for complete search history.

(56) References Cited

U.S. PATENT DOCUMENTS 5,142,550 A * 8/1992 Tymes ........................ 375/141
6,606,303 B1 * 8/2003 Hassel et al. ................ 370/238
6,985,465 B2 * 1/2006 Cervello et al. ............. 370/333
2003/0161321 A1 * 8/2003 Karam et al. ........... 370/395.21

* cited by examiner

Primary Examiner—Chau Nguyen
Assistant Examiner—U-Lun Wang

(57) ABSTRACT

A multi-channel network is disclosed in which channels can be designated as "active" or "inactive" and changes can be made from one channel to another based on a metric which is a function of various channel parameters such as throughput and stability. In one form, the metric is a linear combination of factors such as the mean of the round trip time sequence of previous packets (indicating throughput) and the sample variance of the sequence of retransmission timeout values computed for previous transmission attempts (indicating stability). Regardless of the specific form of the metric or the estimation procedures for the channel parameters, these factors are combined using user-specified weights which permit the user to emphasize the relative importance of individual factors, thereby characterizing the strategy whereby "active" or "inactive" paths are used.

18 Claims, 1 Drawing Sheet

ACTIVE PATH SELECTION FOR SCTP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to network communications. More particularly, the present invention relates to determining a suitable alternate path in a multi-path network transport mechanism. Still more particularly, the invention relates to computing and using the variance of a computed sequence of timeout values as a function in determining a suitable communication path.

2. Background Information

Network communications generally involve a number of devices (called "nodes"), such as computers, that sends and receives data transmissions across a plurality of inter-connected network communication devices, such as switches, routers, and the like. A node typically has several "layers" of network communication-related software. An application running on the node hands the communication software data to be transmitted to a certain node and the communication software generally takes care of coordinating the transfer of the data to the destination node.

One of the software layers is a transmission protocol layer in which a particular communication protocol is implemented on the data. Currently, several competing software standards are used to implement the protocol layer. One such protocol standard is referred to as the Stream Control Transmission Protocol ("SCTP"). SCTP is a robust, high performance communication protocol that generally guarantees delivery of the data to the destination node within a certain period of time, or else will notify the sending node's application of the failure of the communication.

The robustness of SCTP's delivery mechanism is facilitated by its ability to send data via any one of a plurality of communication paths or channels. Broadly, if the current channel is unusable, then the protocol logic will cause a switch to be made to an alternate channel. More specifically, SCTP continuously monitors the availability of each channel to the remote node. This monitoring process entails estimating maximum round-trip times (i.e., the total time for a packet to be transmitted and an acknowledgment to be returned) from successful transmissions, sending heartbeat messages on idle channels, and watching for lost (i.e., unacknowledged) packets for each channel. If certain path-specific thresholds are violated (e.g., repeated expiration of retransmission timeout values), that path can be designated as "inactive" and will not be used to carry further SCTP messages until the situation is rectified.

In conventional SCTP implementations, a list of the channels is maintained. One of the channels is designated as the primary channel and is used for all communications until the thresholds are exceeded for that channel. At that time, the protocol switches to the next channel on the list. If, and when, that channel fails, the protocol again switches to the next channel on the list.

Although the conventional SCTP implementation works well, it is not problem free. In some cases, the algorithms used to monitor the quality of a channel and the thresholds used to invoke the inactive designation can create a type of instability in the transmission of SCTP messages. This instability might be noticed in various ways, including the continued use of an inferior-quality primary channel which has not crossed poorly chosen usability thresholds or the selection of an inferior quality alternate path due to use of poorly chosen thresholds and methods which incorrectly designate the primary path as unusable. In general, current implementations do not always switch to the most appropriate channels when the primary channel exceeds its thresholds. An improved channel switching technique is highly desired.

BRIEF SUMMARY OF THE PREFERRED EMBODIMENTS OF THE INVENTION

The problems noted above are solved in large part by a multi-channel network in which channels can be designated as "inactive" and changes can be made from one channel to another based on a metric which is a function of factors such as estimates of channel throughput and stability. High throughput channels are faster than low throughput channels and highly stable channels are less likely to experience transmission errors than more unstable channels. In accordance with a preferred embodiment, a source node includes an interface to a network and a processor coupled to the interface. For each channel, the processor determines the mean of the round trip time for a plurality of packets transmitted to a destination node, determines the variance of the retransmission timeout values for the plurality of packets, computes a metric using the mean and the variance, and decides whether to switch channels based on the size of the metric. For example, the source node might switch to an alternate channel that has the lowest metric of all available alternate channels. The variance may be computed using the sample variance.

The variance of the retransmission timeout sequence and the mean of the round trip time sequence preferably are suitable, although not the only, factors indicative of channel "goodness." Such factors preferably are linearly combined together using weights applied to the mean and the variance. The weights are user-specified and can be adjusted to suit the needs or preferences of the user. For example, if a linear combination involves only the mean and variance, and the user deems throughput to be of paramount concern, the weight applied to the mean of the round trip time sequence (indicative of throughput) could be set to a value of 1 and the weight applied to the variance of the retransmission timeout sequence (indicative of stability) could be set to a value of 0 so that the metric is simply the mean of the round trip time sequence. This approach emphasizes throughput to the total exclusion of channel stability. On the other hand, if stability is of paramount concern, the weight applied to the mean of the retransmission timeout sequence could be set to a value of 1 and the round trip time sequence's variation weight could be set to a value of 0 so that the metric only reflects channel stability, not throughput. Further still, the weights may both be set to non-zero values (either the same or different values) so that throughput and stability are both considered, albeit to different extents.

In this manner, a more intelligent decision can be made as to when to designate channel as "inactive" as well as to determine the most appropriate alternate channel to switch to. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, manufacturers of network equipment and companies that provide network services may refer to components and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
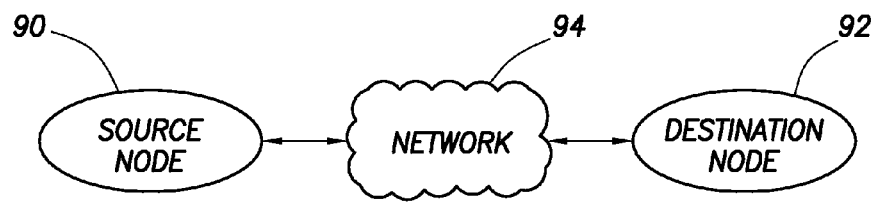
FIG. 1 shows a network to which two or more nodes are coupled.

FIG. 1 shows a source node 90 coupled to a destination node 92 via a network 94. Although only two nodes are shown, the system can include more than two nodes if desired. The destination node preferably has multiple Internet Protocol ("IP") addresses associated with it which permits the source node, which also may have multiple IP addresses, to communicate with the destination node via any one of a plurality of different channels. Each node 90, 92 preferably comprises a computer having a processor (e.g., Pentium class processor), memory, mass storage, input devices (e.g., keyboard, mouse), a display device, and other known components. The nodes also include an interface to the network 94 and implement well known IP layer software. The nodes preferably also implement SCTP-based software modified as described below.

As is commonly known, each packet of data transmitted across the network 94 from a source node 90 to a destination node 92 takes a finite amount of time to arrive at the destination address. Further, a return acknowledgment packet also takes a finite amount of time to be returned to the source node indicating the success or failure of the initial transmission packet. The total time it takes to send the initial packet and receive the return acknowledgment packet is referred to as the round trip time ("RTT").

Figure 2:
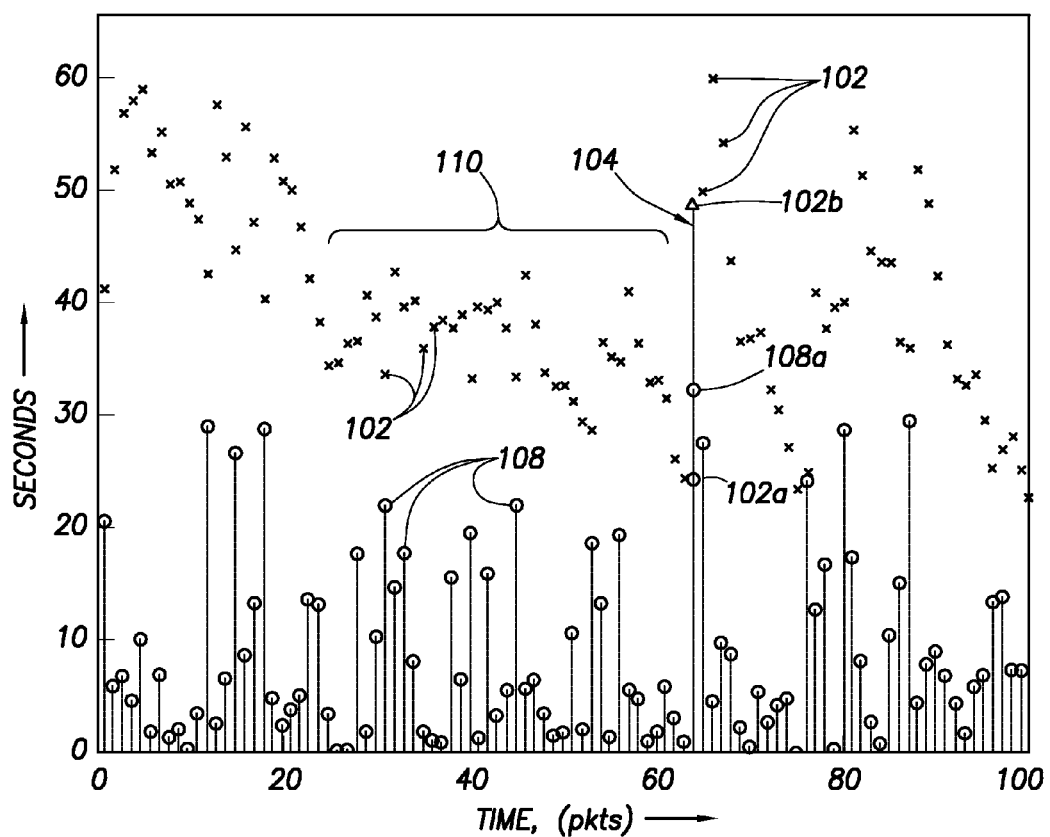
FIG. 2 illustrates the relationship between round trip time and retransmission timeout for a series of packets.

Referring now to FIG. 2, the history of 100 packets of data is shown. The packets are numbered across the horizontal axis. Time is shown in seconds along the vertical axis. The circles 100 indicate the actual RTT as measured from received packets. Network congestion and other factors cause the RTT to vary between packets. According to the SCTP protocol, a retransmission timeout value ("RTO") is computed by the source node for each packet it sends to a destination node. The RTO values are shown in FIG. 2 as the X's 102. The RTO value 102 represents the amount of time that the source node will wait for an acknowledgment from the destination node. The computation of the RTO value will be described in detail below. FIG. 2 is intended to show that the round trip times vary from packet to packet as does the computed RTO values. Event 104 shows that initially, the RTO value 102a was computed as shown (about 25 seconds). However, that amount of time turned out not be long enough and, in accordance with the SCTP standard, the timeout value was doubled to about 50 seconds (shown as 102b). Such doubling of an RTO value is called "binary exponential backoff" and represents a relatively large spike the sequence of RTO values being generated. The acknowledgment packet eventually was received for event 104 as indicated by 108a. Event 104 represents an anomaly that may cause conventional SCTP logic to switch to another channel if repeated several times.

It is observed that the variability of the RTO values 102 is relatively small in the absence of an abnormal event. That is, as portion 110 shows, the RTO values do not vary a great deal. It also is observed that the RTO spikes caused by binary exponential backoff cause the variability of the RTO sequence to increase. As such, it follows that the variability of the RTO sequence for a given channel can be used in conjunction with other factors to determine the stability for the channel. The preferred embodiment takes advantage of this phenomenon to determine a suitable channel to switch to.

In accordance with a preferred embodiment of the invention, a source node computes the variance of the RTO sequence and computes a metric based on that variance. The metric is then analyzed to determine the stability of the channel. In one embodiment, the metric is a linear combination of factors such as the mean of the RTT sequence and the sample variance of the RTO sequence. In this case, the sample variance of the RTO sequence is computed and the metric $P_i$ is computed for each of i paths:

$$P_i = \omega_1 \mu_{RTT} + \omega_2 S^2_{RTO}$$

Where $\mu_{RRT}$ is the mean of the RTT sequence or other suitable indicator of path throughput (latency), $S^2 RTO$ is the sample variance of the RTO sequence (or any suitable function of it). The values $\omega_1$ and $\omega_2$ are user-specified weights which indicate the relative importance of throughput versus stability.

For this embodiment, the mean of the RTT sequence can be calculated in any suitable manner. For example, an estimate of the mean of the RTT sequence can be computed as:

$$\mu_n = \alpha m_n + (1-\alpha)\mu_{n-1}$$

where $\alpha$ is a damping factor, $m_n$ is the current observed RTT and $\mu_{m-1}$ is the mean of the RTT sequence not including the current RTT value.

The $S^2_{RTO}$ value is:

$$S^2_{RTO} = \frac{1}{N-1}\sum_{i=1}^{N}(RTO_{n-1-i} - \overline{RTO_{n-1}})^2$$

where N is the length of the sample vector of RTO values.

Regardless of how the variance of the RTO sequence is calculated (and all possible calculation algorithms are within the scope of this disclosure), the RTO variance can be used as one of several possible measures of the "goodness" of a channel. As described above, the metric P embodying the channel goodness might be a weighted linear combination of the average throughput (latency) of the path with its RTO sample variance. Additionally, the metric P might have more or different linear factors or be of a different form, such as a nonlinear function of factors.

In general, a channel may have a relatively high variance suggesting the occurrence of anomalous events (e.g., event 104), but such channel may also have a much shorter latency than other channels. Other channels may have a relatively low variance suggesting the absence of anomalous events, but have a higher latency. That is, some channels are highly stable, but relatively slow compared to other faster, albeit more unstable, channels. Conventional channel decision algorithms only took into consideration whether a channel's thresholds have been exceeded.

The preferred embodiment, by contrast, computes a metric based on estimates of important channel parameters, such as RTT mean and RTO variance. In the simplified case where the metric is a weighted combination of RTT mean and RTO variance, the weights, $\omega_1$ and $\omega_2$, can be set by the user to emphasize either throughput or stability, depending on what is deemed important to the user. Thus, if the user deems throughput to be of paramount concern, $\omega_1$ could be set to a value of 1 and $\omega_2$ could be set to a value of 0 so that the metric P is simply the mean of the RTT sequence. On the other hand, if stability is of paramount concern, $\omega_2$ could be set to a value of 1 and $\omega_1$ could be set to a value of 0 so that the metric P only reflect channel stability, not throughput. Further still, the values of $\omega_1$ and $\omega_2$ both may be set to different, non-zero values so that throughput and stability are both considered, albeit to different extents. For example, if a user is more interested in throughput than stability, the user might set $\omega_1$ to 0.75 and $\omega_2$ to 0.25, or vice versa if the user was more interested in stability. Further, the metrics of throughput ($\mu_{RTT}$) and stability ($S^2_{RTO}$) can be weighted equally by setting the values of $\omega_1$ and $\omega_2$ the same (e.g., 0.5). The specific values of the weighting values, i.e., the factors to be included in the linear combination, and the form of the metric are entirely user-specific.

By also taking into account the throughput (for example, in the form of average RTT) and stability (for example, in the form of RTO variance), the preferred embodiment of the invention can make a more intelligent decision as to when to designate a channel as "inactive" as well as deciding which channel to switch to when the current channel is deemed to be unusable. This method avoids the occasional instability problem of conventional SCTP implementations described previously.

The above discussion is meant to be illustrative of the principles and various embodiments of the present invention. Numerous variations and modifications will become apparent to those skilled in the art once the above disclosure is fully appreciated. For example, although the preferred embodiment was generally described in terms of SCTP, it should be understood that this disclosure and claims which follow are not limited to SCTP—any communication protocol which can select from a plurality of communication paths is within the scope of the present disclosure. Components can be added or removed from the circuits and different circuits altogether that provide the same benefits and functionality can be used. It is intended that the following claims be interpreted to embrace all such variations and modifications.

What is claimed is:

1. A method of monitoring a plurality of channels in multi-channel network, comprising:
    (a) determining the mean of the round trip time for a plurality of packets transmitted from a source node to a destination node;
    (b) determining the variance of the retransmission timeout for the plurality of packets;
    (c) computing a metric using the mean and the variance; and
    (d) switching from a current channel to a different channel based on the metric.

2. The method of claim 1 wherein (c) includes linearly combining the mean and the variance.

3. The method of claim 1 wherein (c) includes computing a weighted combination of mean and variance wherein the mean is weighted different than the variance.

4. The method of claim 3 wherein (d) includes switching to the channel having the smallest metric.

5. The method of claim 1 wherein (b) includes determining the sample variance of the retransmission timeout.

6. An electronic device attachable to a destination node via a multi-channel network, comprising:
    an interface to said network; and
    a processor coupled to said interface, said processor determining the mean of the round trip time for a plurality of packets transmitted to a destination node, determining the variance of the retransmission timeout for the plurality of packets, computing a metric using the mean and the variance, and deciding whether to switch channels based on the metric.

7. The electronic device of claim 6 wherein said processor computes said metric by linearly combining the mean and the variance.

8. The electronic device of claim 6 wherein said processor computes said metric by computing a weighted combination of mean and variance wherein the mean is weighted different than the variance.

9. The electronic device of claim 8 wherein said processor decides to switch to the channel having the smallest metric.

10. The electronic device of claim 6 wherein said processor determines the sample variance of the retransmission timeout.

11. A system, comprising:
    a multi-channel network;
    a source node coupled to said network; and
    a destination node coupled to said network, said source node sending data packets to said destination node;
    wherein said source node determines the mean of the round trip time for a plurality of packets transmitted to a destination node, determines the variance of the retransmission timeout for the plurality of packets, computes a metric using the mean and the variance, and decides whether to switch channels based on the metric.

12. The system of claim 11 wherein said source node computes said metric by linearly combining the mean and the variance.

13. The system of claim 11 wherein said source node computes said metric by computing a weighted combination of mean and variance wherein the mean is weighted different than the variance.

14. The system of claim 13 wherein said source node decides to switch to the channel having the smallest metric.

15. The system of claim 11 wherein said source node determines the sample variance of the retransmission timeout.

16. A method of monitoring a plurality of channels in multi-channel network, comprising:
 (a) determining the mean of the round trip time for a plurality of packets transmitted from a source node to a destination node;
 (b) determining the variance of the retransmission timeout for the plurality of packets;
 (c) computing a metric using the mean and the variance; and
 (d) designating a channel as unusable for communications based on the metric.

17. The method of claim 16 wherein (c) comprises computing the metric as a weighted average of the mean and the variance.

18. The method of claim 17 further comprising receiving user input to separately specify weights for the mean and the variance.

* * * * *